United States Patent
Tsai et al.

(10) Patent No.: US 12,439,036 B2
(45) Date of Patent: Oct. 7, 2025

(54) METHODS AND APPARATUSES OF LOOP FILTER PARAMETER SIGNALING IN IMAGE OR VIDEO PROCESSING SYSTEM

(71) Applicant: HFI Innovation Inc., Zhubei (TW)

(72) Inventors: Chia-Ming Tsai, Hsinchu (TW); Chih-Wei Hsu, Hsinchu (TW); Shih-Ta Hsiang, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 312 days.

(21) Appl. No.: 17/904,882

(22) PCT Filed: Feb. 25, 2021

(86) PCT No.: PCT/CN2021/077862
§ 371 (c)(1),
(2) Date: Aug. 24, 2022

(87) PCT Pub. No.: WO2021/170036
PCT Pub. Date: Sep. 2, 2021

(65) Prior Publication Data
US 2023/0087875 A1   Mar. 23, 2023

Related U.S. Application Data
(60) Provisional application No. 62/981,583, filed on Feb. 26, 2020.

(51) Int. Cl.
*H04N 19/117* (2014.01)
*H04N 19/172* (2014.01)
(Continued)

(52) U.S. Cl.
CPC ......... *H04N 19/117* (2014.11); *H04N 19/172* (2014.11); *H04N 19/174* (2014.11);
(Continued)

(58) Field of Classification Search
CPC .... H04N 19/86; H04N 19/112; H04N 19/117; H04N 19/70
See application file for complete search history.

(56) References Cited

U.S. PATENT DOCUMENTS

| 10,397,568 B2 | 8/2019 | Liu et al. |
| 10,412,419 B2 | 9/2019 | Kim et al. |

(Continued)

FOREIGN PATENT DOCUMENTS

| CN | 104584560 A | 4/2015 |
| CN | 105532007 A | 4/2016 |

(Continued)

OTHER PUBLICATIONS

Extended European Search Report dated Mar. 26, 2024, issued in application No. EP 21759879.6.
(Continued)

*Primary Examiner* — On S Mung
(74) *Attorney, Agent, or Firm* — McClure, Qualey & Rodack, LLP

(57) ABSTRACT

Image or video processing methods and apparatuses comprise receiving input data associated with a current picture or a current slice in the current picture, determining whether the current picture is a monochrome picture, conditionally signaling or parsing chroma deblocking parameters depending on whether the current picture is a monochrome picture, and encode or decode the current picture or current slice. The chroma deblocking parameters are used in a deblocking filter operation applied to chroma components of the current picture or current slice when the current picture is not a monochrome picture. A syntax element may be used to indicate derivation of chroma deblocking parameters, and based on a value of the syntax element, the chroma deblocking parameters are allowed to be explicitly signaled in or (Continued)

parsed from a syntax structure, or the chroma deblocking parameters are implicitly inferred.

5 Claims, 7 Drawing Sheets

(51) Int. Cl.
    *H04N 19/174*     (2014.01)
    *H04N 19/186*     (2014.01)
    *H04N 19/70*     (2014.01)
    *H04N 19/86*     (2014.01)

(52) U.S. Cl.
    CPC .......... *H04N 19/186* (2014.11); *H04N 19/70* (2014.11); *H04N 19/86* (2014.11)

(56) References Cited

U.S. PATENT DOCUMENTS

| | | | |
|---|---|---|---|
| 10,904,580 | B2 | 1/2021 | Huang et al. |
| 10,972,735 | B2 | 4/2021 | Sullivan |
| 2007/0121728 | A1 | 5/2007 | Wang et al. |
| 2019/0020875 | A1 | 1/2019 | Liu et al. |
| 2019/0306503 | A1 | 10/2019 | Dong et al. |
| 2022/0394303 | A1 | 12/2022 | Sun et al. |

FOREIGN PATENT DOCUMENTS

| | | |
|---|---|---|
| CN | 107251555 A | 10/2017 |
| CN | 109196862 A | 1/2019 |
| WO | 2021155740 A1 | 8/2021 |
| WO | 2021155834 A1 | 8/2021 |
| WO | 2021167830 A1 | 8/2021 |
| WO | 2021172471 A1 | 9/2021 |

OTHER PUBLICATIONS

Kotra, A M., et al.; "AHG9: Modified signalling of Chroma deblocking control parameters;" Joint Video Experts Team (JVET) of ITU-T SG 16 WP 3 and ISO/IEC JTC 1/SC 29/WG 11; Apr. 2020; pp. 1-9.

Zhang, N., et al.; "Non-CE: Various chroma format support in VVC;" Joint Video Experts Team (JVET) of ITU-T SG 16 WP 3 and ISO/IEC JTC 1/SC 29/WG 11; Jul. 2019; pp. 1-3.

Li, L., et al.; "AHG12: Signaling of chroma presence in PPS and APS;" Joint Video Experts Team (JVET) of ITU-T SG 16 WP 3 and ISO/IEC JTC 1/SC 29/WG 11; Jan. 2020; pp. 1-3.

Bross, B., et al.; "Versatile Video Coding (Draft 8);" Joint Video Experts Team (JVET) of ITU-T SG 16 WP 3 and ISO/IEC JTC 1/SC 29/WG 11; Jan. 2020; pp. 1-509.

International Search Report and Written Opinion dated May 25, 2021, issued in application No. PCT/CN2021/077862.

Tsai, C., et al.; "AHG9: On chroma deblocking parameters;" Joint Video Experts Team (JVET) of ITU-T SG 16 WP 3 and ISO/IEC JTC 1/SC 29/WG 11; Apr. 2020; pp. 1-3.

Xu, J., et al.; "AHG9: On deblocking control parameters;" Joint Video Experts Team (JVET) of ITU-T SG 16 WP 3 and ISO/IEC JTC 1/SC 29/WG 11; Jan. 2020; pp. 1-7.

Chinese language office action dated Jan. 17, 2022, issued in application No. TW 110106952.

Chinese language office action dated Aug. 31, 2024, issued in application No. CN 202180015163.5.

Bross, B., et al.; "Versatile Video Coding (Draft 8);" Joint Video Experts Team (JVET) of ITU-T SG 16 WO 3 and ISO/IEC JTC 1/SC 29/WG 11; Jan. 2020; pp. 1-6.

KR Office Action dated Feb. 26, 2025 in Korean application No. 10-2022-7031849.

Bross, B., et al.; "Versatile Video Coding (Draft 8)" (published on Feb. 9, 2020).

METHODS AND APPARATUSES OF LOOP FILTER PARAMETER SIGNALING IN IMAGE OR VIDEO PROCESSING SYSTEM

CROSS REFERENCE TO RELATED APPLICATIONS

The present invention claims priority to U.S. Provisional Patent Application Ser. No. 62/981,583, filed on Feb. 26, 2020, entitled "Methods and Apparatus of Signaling Loop Filter Parameters for Image and Video Coding". The U.S. Provisional Patent Application is hereby incorporated by reference in its entirety.

FIELD OF THE INVENTION

The present invention relates to image or video data processing methods and apparatuses for image or video encoding or decoding. In particular, the present invention relates to loop filter parameter signaling for image or video processing systems.

BACKGROUND AND RELATED ART

The High-Efficiency Video Coding (HEVC) standard is the latest video coding standard developed by the Joint Collaborative Team on Video Coding (JCT-VC) group of video coding experts from ITU-T Study Group. The HEVC standard relies on a block-based coding structure which divides each slice into multiple Coding Tree Units (CTUs). A CTU consists of an N×N block of luminance (luma) samples together with two corresponding blocks of chrominance (chroma) samples. FIG. 1 shows an example of a picture divided into multiple CTUs. In HEVC, the maximum allowed size of a luma block in a CTU is specified to be equal to 128×128 although the maximum size of a luma transform block is 64×64. The CTUs in a slice are processed according to a raster scan order. Each CTU is further recursively divided into one or more Coding Units (CUs) according to a quadtree (QT) partitioning method to adapt to various local characteristics. Each CTU may be a single CU or split into four smaller units of equal sizes, which are split nodes of the coding tree. If units are leaf nodes of the coding tree, the units become CUs, otherwise, the quadtree splitting process partitions each unit iteratively until the size of a node reaches a minimum allowed CU size specified in a Sequence Parameter Set (SPS).

The prediction decision is made at the CU level, where each CU is either coded by inter picture (temporal) prediction or intra picture (spatial) prediction. Once the splitting of CU hierarchical tree is done, each CU is subject to further split into one or more Prediction Units (PUs) according to a PU partition type for prediction in HEVC. The PU works as a basic representative block for sharing the prediction information as the same prediction process is applied to all pixels in the PU and prediction relevant information is conveying to the decoder on a PU basis. After obtaining a residual signal generated by the prediction process based on the PU splitting type, data of the residual signal belong to a CU is further split into one or more Transform Units (TUs) according to another QT block partitioning structure for transforming the residual signal into transform coefficients for compact data representation. The TU is a basic representative block for applying integer transform and quantization on the residual signal. For each TU, one transform matrix having the same size as the TU is applied to the residual signal to generate transform coefficients, and these transform coefficients are quantized and conveyed to the decoder on a TU basis.

The terms Coding Tree Block (CTB), Coding block (CB), Prediction Block (PB), and Transform Block (TB) are defined to specify two-dimensional sample array of one color component associated with the CTU, CU, PU, and TU respectively. For example, a CTU consists of one luminance (luma) CTB, two chrominance (chroma) CTBs, and its associated syntax elements. In the HEVC system, the same quadtree block partitioning structure is generally applied to both luma and chroma components unless a minimum size for chroma block is reached.

Various Partitioning of Pictures A picture is divided into one or more tile rows and one or more tile columns. A tile is a sequence of CTUs that covers a rectangular region of the picture. A slice consists of an integer number of complete tiles or an integer number of consecutive complete CTU rows within a tile of a picture. The raster-scan slice mode and rectangular slice mode are two modes of slices supported in video encoding and decoding. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in a tile raster scan order within the rectangular region corresponding to that slice. A subpicture contains one or more slices that collectively cover a rectangular region of a picture. FIG. 2 illustrates an example of raster-scan slice partitioning of a picture, where the picture is divided into 12 tiles and 3 raster-scan slices. There are 3 tile columns and 4 tile rows in the picture as shown in FIG. 2, and each tile consists of 18 CTUs. A first slice of the picture consists of the first 2 tiles, a second slice consists of five consecutive 5 tiles, and a third slice consists of the remaining 5 tiles. FIG. 3 illustrates an example of rectangular slice partitioning of a picture, where the picture is divided into 24 tiles and 9 rectangular slices. There are 6 tile columns and 4 tile rows in this example. Except for the fourth, fifth, and sixth rectangular slices each having 4 tiles, all other rectangular slices are consisting of 2 tiles. FIG. 4 shows an example of a picture partitioned into tiles and rectangular slices, where the picture is divided into 4 tiles and 4 rectangular slices. In this example, there are 2 tile columns and 2 tile rows, and each tile contains 54 CTUs. A slice in this example may contain 2 tiles, or alternatively, a tile may contain 2 slices. FIG. 5 shows an example of subpicture partitioning of a picture, where the picture is partitioned into 28 subpictures of varying dimensions.

High Level Syntax for Picture Header and Slice Header Based on Versatile Video Coding (VVC) Draft 8, Table 1 lists picture parameter set RB SP syntax signaled in a Picture Parameter Set (PPS).

TABLE 1

| | Descriptor |
|---|---|
| pic_parameter_set_rbsp( ) { | |
|   pps_pic_parameter_set_id | ue(v) |
|   pps_seq_parameter_set_id | u(4) |
|   mixed_nalu_types_in_pic_flag | u(1) |
|   pic_width_in_luma_samples | ue(v) |
|   pic_height_in_luma_samples | ue(v) |
|   pps_conformance_window_flag | u(1) |
|   if( pps_conformance_window_flag ) { | |

TABLE 1-continued

| | Descriptor |
|---|---|
| pps_conf_win_left_offset | ue(v) |
| pps_conf_win_right_offset | ue(v) |
| pps_conf_win_top_offset | ue(v) |
| pps_conf_win_bottom_offset | ue(v) |
| } | |
| scaling_window_explicit_signalling_flag | u(1) |
| if( scaling_window_explicit_signalling_flag ) { | |
|   scaling_win_left_offset | ue(v) |
|   scaling_win_right_offset | ue(v) |
|   scaling_win_top_offset | ue(v) |
|   scaling_win_bottom_offset | ue(v) |
| } | |
| output_flag_present_flag | u(1) |
| subpic_id_mapping_in_pps_flag | u(1) |
| if( subpic_id_mapping_in_pps_flag ) { | |
|   pps_num_subpics_minus1 | ue(v) |
|   pps_subpic_id_len_minus1 | ue(v) |
|   for( i = 0; i <= pps_num_subpic_minus1; i++ ) | |
|     pps_subpic_id[ i ] | u(v) |
| } | |
| no_pic_partition_flag | u(1) |
| if( !no_pic_partition_flag ) { | |
|   pps_log2_ctu_size_minus5 | u(2) |
|   num_exp_tile_columns_minus1 | ue(v) |
|   num_exp_tile_rows_minus1 | ue(v) |
|   for( i = 0; i <= num_exp_tile_columns_minus1; i++ ) | |
|     tile_column_width_minus1[ i ] | ue(v) |
|   for( i = 0; i <= num_exp_tile_rows_minus1; i++ ) | |
|     tile_row_height_minus1[ i ] | ue(v) |
|   if( NumTilesInPic > 1 ) | |
|     rect_slice_flag | u(1) |
|   if( rect_slice_flag ) | |
|     single_slice_per_subpic_flag | u(1) |
|   if( rect_slice_flag && | |
|     !single_slice_per_subpic_flag ) { | |
|     num_slices_in_pic_minus1 | ue(v) |
|     if( num_slices_in_pic_minus1 > 0 ) | |
|       tile_idx_delta_present_flag | u(1) |
|     for( i = 0; i < num_slices_in_pic_minus1; i++ ) { | |
|       if( NumTileColumns > 1 ) | |
|         slice_width_in_tiles_minus1[ i ] | ue(v) |
|       if( NumTileRows > 1 && | |
|         ( tile_idx_delta_present_flag \|\| tileIdx % NumTileColumns = = 0 ) ) | |
|         slice_height_in_tiles_minus1[ i ] | ue(v) |
|       if( slice_width_in_tiles_minus1[ i ] = = 0 && | |
|         slice_height_in_tiles_minus1[ i ] = = 0 && | |
|         RowHeight[ SliceTopLeftTileIdx[ i ] / NumTileColumns ] > 1 ) { | |
|         num_exp_slices_in_tile[ i ] | ue(v) |
|         for( j = 0; j < num_exp_slices_in_tile[ i ]; j++ ) | |
|           exp_slice_height_in_ctus_minus1[ j ] | ue(v) |
|         i += NumSlicesInTile[ i ] − 1 | |
|       } | |
|       if( tile_idx_delta_present_flag && i < num_slices_in_pic_minus1 ) | |
|         tile_idx_delta[ i ] | se(v) |
|     } | |
|   } | |
|   loop_filter_across_tiles_enabled_flag | u(1) |
|   loop_filter_across_slices_enabled_flag | u(1) |
| } | |
| cabac_init_present_flag | u(1) |
| for( i = 0; i < 2; i++ ) | |
|   num_ref_idx_default_active_minus1[ i ] | ue(v) |
| rpl1_idx_present_flag | u(1) |
| init_qp_minus26 | se(v) |
| cu_qp_delta_enabled_flag | u(1) |
| pps_chroma_tool_offsets_present_flag | u(1) |
| if( pps_chroma_tool_offsets_present_flag ) { | |
|   pps_cb_qp_offset | se(v) |
|   pps_cr_qp_offset | se(v) |
|   pps_joint_cbcr_qp_offset_present_flag | u(1) |
|   if( pps_joint_cbcr_qp_offset_present_flag ) | |
|     pps_joint_cbcr_qp_offset_value | se(v) |
|   pps_slice_chroma_qp_offsets_present_flag | u(1) |
|   pps_cu_chroma_qp_offset_list_enabled_flag | u(1) |
| } | |
| if( pps_cu_chroma_qp_offset_list_enabled_flag ) { | |
|   chroma_qp_offset_list_len_minus1 | ue(v) |
|   for( i = 0; i <= chroma_qp_offset_list_len_minus1; i++ ) { | |
|     cb_qp_offset_list[ i ] | se(v) |
|     cr_qp_offset_list[ i ] | se(v) |
|     if( pps_joint_cbcr_qp_offset_present_flag ) | |
|       joint_cbcr_qp_offset_list[ i ] | se(v) |
|   } | |
| } | |
| pps_weighted_pred_flag | u(1) |
| pps_weighted_bipred_flag | u(1) |
| deblocking_filter_control_present_flag | u(1) |
| if( deblocking_filter_control_present_flag ) { | |
|   deblocking_filter_override_enabled_flag | u(1) |
|   pps_deblocking_filter_disabled_flag | u(1) |
|   if( !pps_deblocking_filter_disabled_flag ) { | |
|     pps_beta_offset_div2 | se(v) |
|     pps_tc_offset_div2 | se(v) |
|     pps_cb_beta_offset_div2 | se(v) |
|     pps_cb_tc_offset_div2 | se(v) |
|     pps_cr_beta_offset_div2 | se(v) |
|     pps_cr_tc_offset_div2 | se(v) |
|   } | |
| } | |
| rpl_info_in_ph_flag | u(1) |
| if( deblocking_filter_override_enabled_flag ) | |
|   dbf_info_in_ph_flag | u(1) |
| sao_info_in_ph_flag | u(1) |
| alf_info_in_ph_flag | u(1) |
| if( ( pps_weighted_pred_flag \|\| pps_weighted_bipred_flag ) && rpl_info_in_ph_flag ) | |
|   wp_info_in_ph_flag | u(1) |
| qp_delta_info_in_ph_flag | u(1) |
| pps_ref_wraparound_enabled_flag | u(1) |
| if( pps_ref_wraparound_enabled_flag ) | |
|   pps_ref_wraparound_offset | ue(v) |
| picture_header_extension_present_flag | u(1) |
| slice_header_extension_present_flag | u(1) |
| pps_extension_flag | u(1) |
| if( pps_extension_flag ) | |
|   while( more_rbsp_data( ) ) | |
|     pps_extension_data_flag | u(1) |
| rbsp_trailing_bits( ) | |
| } | |

Table 2 and Table 3 show Picture Header (PH) syntax and Slice Header (SH) syntax in VVC Draft 8 respectively. In cases if Access Unit Delimiter (AUD) precedes SPS and PPS, some picture-level syntax elements in the SH cannot be moved to AUD. Asserting the PH may solve this problem.

TABLE 2

| | Descriptor |
|---|---|
| picture_header_structure( ) { | |
|   gdr_or_irap_pic_flag | u(1) |
|   if( gdr_or_irap_pic_flag ) | |
|     gdr_pic_flag | u(1) |
|   ph_inter_slice_allowed_flag | u(1) |
|   if( ph_inter_slice_allowed_flag ) | |

TABLE 2-continued

| | Descriptor |
|---|---|
| ph_intra_slice_allowed_flag | u(1) |
| non_reference_picture_flag | u(1) |
| ph_pic_parameter_set_id | ue(v) |
| ph_pic_order_cnt_lsb | u(v) |
| if( gdr_or_irap_pic_flag ) | |
|   no_output_of_prior_pics_flag | u(1) |
| if( gdr_pic_flag ) | |
|   recovery_poc_cnt | ue(v) |
| for( i = 0; i < NumExtraPhBits; i++ ) | |
|   ph_extra_bit[ i ] | u(1) |
| if( sps_poc_msb_flag ) { | |
|   ph_poc_msb_present_flag | u(1) |
|   if( ph_poc_msb_present_flag ) | |
|     poc_msb_val | u(v) |
| } | |
| if( sps_alf_enabled_flag && alf_info_in_ph_flag ) { | |
|   ph_alf_enabled_flag | u(1) |
|   if( ph_alf_enabled_flag ) { | |
|     ph_num_alf_aps_ids_luma | u(3) |
|     for( i = 0; i < ph_num_alf_aps_ids_luma; i++ ) | |
|       ph_alf_aps_id_luma[ i ] | u(3) |
|     if( ChromaArrayType != 0 ) | |
|       ph_alf_chroma_idc | u(2) |
|     if( ph_alf_chroma_idc > 0 ) | |
|       ph_alf_aps_id_chroma | u(3) |
|     if( sps_ccalf_enabled_flag ) { | |
|       ph_cc_alf_cb_enabled_flag | u(1) |
|       if( ph_cc_alf_cb_enabled_flag ) | |
|         ph_cc_alf_cb_aps_id | u(3) |
|       ph_cc_alf_cr_enabled_flag | u(1) |
|       if( ph_cc_alf_cr_enabled_flag ) | |
|         ph_cc_alf_cr_aps_id | u(3) |
|     } | |
|   } | |
| } | |
| if( sps_lmcs_enabled_flag ) { | |
|   ph_lmcs_enabled_flag | u(1) |
|   if( ph_lmcs_enabled_flag ) { | |
|     ph_lmcs_aps_id | u(2) |
|     if( ChromaArrayType != 0 ) | |
|       ph_chroma_residual_scale_flag | u(1) |
|   } | |
| } | |
| if( sps_scaling_list_enabled_flag ) { | |
|   ph_scaling_list_present_flag | u(1) |
|   if( ph_scaling_list_present_flag ) | |
|     ph_scaling_list_aps_id | u(3) |
| } | |
| if( sps_virtual_boundaries_enabled_flag && !sps_virtual_boundaries_present_flag ) { | |
|   ph_virtual_boundaries_present_flag | u(1) |
|   if( ph_virtual_boundaries_present_flag ) { | |
|     ph_num_ver_virtual_boundaries | u(2) |
|     for( i = 0; i < ph_num_ver_virtual_boundaries; i++ ) | |
|       ph_virtual_boundaries_pos_x[ i ] | u(13) |
|     ph_num_hor_virtual_boundaries | u(2) |
|     for( i = 0; i < ph_num_hor_virtual_boundaries; i++ ) | |
|       ph_virtual_boundaries_pos_y[ i ] | u(13) |
|   } | |
| } | |
| if( output_flag_present_flag ) | |
|   pic_output_flag | u(1) |
| if( rpl_info_in_ph_flag ) | |
|   ref_pic_lists( ) | |
| if( partition_constraints_override_enabled_flag ) | |
|   partition_constraints_override_flag | u(1) |
| if( ph_intra_slice_allowed_flag ) { | |
|   if( partition_constraints_override_flag ) { | |
|     ph_log2_diff_min_qt_min_cb_intra_slice_luma | ue(v) |
|     ph_max_mtt_hierarchy_depth_intra_slice_luma | ue(v) |
|     if( ph_max_mtt_hierarchy_depth_intra_slice_luma != 0 ) { | |
|       ph_log2_diff_max_bt_min_qt_intra_slice_luma | ue(v) |
|       ph_log2_diff_max_tt_min_qt_intra_slice_luma | ue(v) |
|     } | |
|     if( qtbtt_dual_tree_intra_flag ) { | |
|       ph_log2_diff_min_qt_min_cb_intra_slice_chroma | ue(v) |
|       ph_max_mtt_hierarchy_depth_intra_slice_chroma | ue(v) |
|       if( ph_max_mtt_hierarchy_depth_intra_slice_chroma != 0 ) { | |
|         ph_log2_diff_max_bt_min_qt_intra_slice_chroma | ue(v) |

TABLE 2-continued

| | Descriptor |
|---|---|
| ⋯⋯⋯⋯ph_log2_diff_max_tt_min_qt_intra_slice_chroma<br>⋯⋯⋯}<br>⋯⋯⋯}<br>⋯⋯}<br>⋯⋯if( cu_qp_delta_enabled_flag )<br>⋯⋯⋯⋯ph_cu_qp_delta_subdiv_intra_slice | ue(v)<br><br><br><br><br>ue(v) |
| ⋯⋯if( pps_cu_chroma_qp_offset_list_enabled_flag )<br>⋯⋯⋯⋯ph_cu_chroma_qp_offset_subdiv_intra_slice<br>⋯}<br>⋯if( ph_inter_slice_allowed_flag ) {<br>⋯⋯if( partition_constraints_override_flag ) {<br>⋯⋯⋯⋯ph_log2_diff_min_qt_min_cb_inter_slice<br>⋯⋯⋯⋯ph_max_mtt_hierarchy_depth_inter_slice<br>⋯⋯⋯if( ph_max_mtt_hierarchy_depth_inter_slice != 0 ) {<br>⋯⋯⋯⋯ph_log2_diff_max_bt_min_qt_inter_slice<br>⋯⋯⋯⋯ph_log2_diff_max_tt_min_qt_inter_slice<br>⋯⋯⋯}<br>⋯⋯}<br>⋯⋯if( cu_qp_delta_enabled_flag )<br>⋯⋯⋯⋯ph_cu_qp_delta_subdiv_inter_slice | <br>ue(v)<br><br><br><br>ue(v)<br>ue(v)<br><br>ue(v)<br>ue(v)<br><br><br><br>ue(v) |
| ⋯⋯if( pps_cu_chroma_qp_offset_list_enabled_flag )<br>⋯⋯⋯⋯ph_cu_chroma_qp_offset_subdiv_inter_slice<br>⋯⋯if( sps_temporal_mvp_enabled_flag ) {<br>⋯⋯⋯⋯ph_temporal_mvp_enabled_flag<br>⋯⋯⋯if( ph_temporal_mvp_enabled_flag && rpl_info_in_ph_flag ) {<br>⋯⋯⋯⋯ph_collocated_from_l0_flag<br>⋯⋯⋯⋯if( ( ph_collocated_from_l0_flag &&<br>⋯⋯⋯⋯⋯num_ref_entries[ 0 ][ RplsIdx[ 0 ] ] > 1 ) ∥<br>⋯⋯⋯⋯⋯( !ph_collocated_from_l0_flag &&<br>⋯⋯⋯⋯⋯num_ref_entries[ 1 ][ RplsIdx[ 1 ] ] > 1 ) )<br>⋯⋯⋯⋯⋯ph_collocated_ref_idx<br>⋯⋯⋯}<br>⋯⋯} | <br>ue(v)<br><br>u(1)<br><br>u(1)<br><br><br><br><br>ue(v) |
| ⋯⋯mvd_l1_zero_flag<br>⋯⋯if( sps_fpel_mmvd_enabled_flag )<br>⋯⋯⋯⋯ph_fpel_mmvd_enabled_flag<br>⋯⋯if( sps_bdof_pic_present_flag )<br>⋯⋯⋯⋯ph_disable_bdof_flag<br>⋯⋯if( sps_dmvr_pic_present_flag )<br>⋯⋯⋯⋯ph_disable_dmvr_flag<br>⋯⋯if( sps_prof_pic_present_flag )<br>⋯⋯⋯⋯ph_disable_prof_flag<br>⋯⋯if( ( pps_weighted_pred_flag ∥ pps_weighted_bipred_flag ) &&<br>wp_info_in_ph_flag )<br>⋯⋯⋯⋯pred_weight_table( )<br>⋯} | u(1)<br><br>u(1)<br><br>u(1)<br><br>u(1)<br><br>u(1) |
| ⋯if( qp_delta_info_in_ph_flag )<br>⋯⋯ph_qp_delta<br>⋯if( sps_joint_cbcr_enabled_flag )<br>⋯⋯ph_joint_cbcr_sign_flag<br>⋯if( sps_sao_enabled_flag && sao_info_in_ph_flag ) {<br>⋯⋯ph_sao_luma_enabled_flag<br>⋯⋯if( ChromaArrayType != 0 )<br>⋯⋯⋯⋯ph_sao_chroma_enabled_flag<br>⋯} | <br>se(v)<br><br>u(1)<br><br>u(1)<br><br>u(1) |
| ⋯if( sps_dep_quant_enabled_flag )<br>⋯⋯ph_dep_quant_enabled_flag<br>⋯if( sps_sign_data_hiding_enabled_flag && !ph_dep_quant_enabled_flag )<br>⋯⋯pic_sign_data_hiding_enabled_flag<br>⋯if( deblocking_filter_override_enabled_flag && dbf_info_in_ph_flag ) {<br>⋯⋯ph_deblocking_filter_override_flag<br>⋯⋯if( ph_deblocking_filter_override_flag ) {<br>⋯⋯⋯⋯ph_deblocking_filter_disabled_flag<br>⋯⋯⋯if( !ph_deblocking_filter_disabled_flag ) {<br>⋯⋯⋯⋯ph_beta_offset_div2<br>⋯⋯⋯⋯ph_tc_offset_div2<br>⋯⋯⋯⋯ph_cb_beta_offset_div2<br>⋯⋯⋯⋯ph_cb_tc_offset_div2<br>⋯⋯⋯⋯ph_cr_beta_offset_div2<br>⋯⋯⋯⋯ph_cr_tc_offset_div2<br>⋯⋯⋯}<br>⋯⋯}<br>⋯} | <br>u(1)<br><br>u(1)<br><br>u(1)<br><br>u(1)<br><br>se(v)<br>se(v)<br>se(v)<br>se(v)<br>se(v)<br>se(v) |
| ⋯if( picture_header_extension_present_flag ) {<br>⋯⋯ph_extension_length | <br>ue(v) |

TABLE 2-continued

| | Descriptor |
|---|---|
| for( i = 0; i < ph_extension_length; i++) | |
|     ph_extension_data_byte[ i ] | u(8) |
| } | |
| } | |

TABLE 3

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( (rect_slice_flag && NumSlicesInSubpic[ CurrSubpicIdx ] > 1 ) \|\| | |
|     ( !rect_slice_flag && NumTilesInPic > 1 ) ) | |
|     slice_address | u(v) |
|   for( i = 0; i < NumExtraShBits; i++ ) | |
|     sh_extra_bit[ i ] | u(1) |
|   if( !rect_slice_flag && NumTilesInPic > 1 ) | |
|     num_tiles_in_slice_minus1 | ue(v) |
|   if( ph_inter_slice_allowed_flag ) | |
|     slice_type | ue(v) |
|   if( sps_alf_enabled_flag && !alf_info_in_ph_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |
|       if( sps_ccalf_enabled_flag ) { | |
|         slice_cc_alf_cb_enabled_flag | u(1) |
|         if( slice_cc_alf_cb_enabled_flag ) | |
|           slice_cc_alf_cb_aps_id | u(3) |
|         slice_cc_alf_cr_enabled_flag | u(1) |
|         if( slice_cc_alf_cr_enabled_flag ) | |
|           slice_cc_alf_cr_aps_id | u(3) |
|       } | |
|     } | |
|   } | |
|   if( separate_colour_plane_flag = = 1 ) | |
|     colour_plane_id | u(2) |
|   if( !rpl_info_in_ph_flag && ( ( nal_unit_type != IDR_W_RADL && nal_unit_type != | |
|     IDR_N_LP ) \|\| sps_idr_rpl_present_flag ) ) | |
|     ref_pic_lists( ) | |
|   if( ( rpl_info_in_ph_flag \|\| ( ( nal_unit_type != IDR_W_RADL && nal_unit_ type != | |
|     IDR_N_LP ) \|\| sps_idr_rpl_present_flag ) ) && | |
|     ( slice_type != I && num_ref_entries[ 0 ][ RplsIdx[ 0 ] ] > 1 ) \|\| | |
|     ( slice_type = = B && num_ref_entries[ 1 ][ RplsIdx[ 1 ] ] > 1 ) ) { | |
|     num_ref_idx_active_override_flag | u(1) |
|     if( num_ref_idx_active_override_flag ) | |
|       for( i = 0; i < ( slice_type = = B ? 2: 1); i++ ) | |
|         if( num_ref_entries[ i ][ RplsIdx[ i ] ] > 1 ) | |
|           num_ref_idx_active_minus1[ i ] | ue(v) |
|   } | |
|   if( slice_type != I ) { | |
|     if( cabac_init_present_flag ) | |
|       cabac_init_flag | u(1) |
|     if( ph_temporal_mvp_enabled_flag && !rpl_info_in_ph_flag ) { | |
|       if( slice_type = = B ) | |
|         slice_collocated_from_l0_flag | u(1) |
|       if( ( slice_collocated_from_l0_flag && NumRefIdxActive[ 0 ] > 1 ) \|\| | |
|         ( ! slice_collocated_from_l0_flag && NumRefIdxActive[ 1 ] > 1 ) ) | |
|         slice_collocated_ref_idx | ue(v) |
|     } | |
|     if( !wp_info_in_ph_flag && ( ( pps_weighted_pred_flag && slice_type = = P ) \|\| | |
|       ( pps_weighted_bipred_flag && slice_type = = B ) ) ) | |
|       pred_weight_table( ) | |
|   } | |
|   if( !qp_delta_info_in_ph_flag ) | |
|     slice_qp_delta | se(v) |
|   if( pps_slice_chroma_qp_offsets_present_flag ) { | |
|     slice_cb_qp_offset | se(v) |
|     slice_cr_qp_offset | se(v) |
|     if( sps_joint_cbcr_enabled_flag ) | |
|       slice_joint_cbcr_qp_offset | se(v) |
|   } | |
|   if( pps_cu_chroma_qp_offset_list_enabled_flag ) | |
|     cu_chroma_qp_offset_enabled_flag | u(1) |
|   if( sps_sao_enabled_flag && !sao_info_in_ph_flag ) { | |
|     slice_sao_luma_flag | u(1) |
|     if( ChromaArrayType != 0 ) | |
|       slice_sao_chroma_flag | u(1) |
|   } | |
|   if( deblocking_filter_override_enabled_flag && !dbf_info_in_ph_flag ) | |
|     slice_deblocking_filter_override_flag | u(1) |
|   if( slice_deblocking_filter_override_flag ) { | |
|     slice_deblocking_filter_disabled_flag | u(1) |
|     if( !slice_deblocking_filter_disabled_flag ) { | |
|       slice_beta_offset_div2 | se(v) |
|       slice_tc_offset_div2 | se(v) |
|       slice_cb_beta_offset_div2 | se(v) |
|       slice_cb_tc_offset_div2 | se(v) |
|       slice_cr_beta_offset_div2 | se(v) |
|       slice_cr_tc_offset_div2 | se(v) |
|     } | |
|   } | |
|   slice_ts_residual_coding_disabled_flag | u(1) |
|   if( ph_lmcs_enabled_flag ) | |
|     slice_lmcs_enabled_flag | u(1) |
|   if( ph_scaling_list_enabled_flag ) | |
|     slice_scaling_list_present_flag | u(1) |
|   if( NumEntryPoints > 0 ) { | |
|     offset_len_minus1 | ue(v) |
|     for( i = 0; i < NumEntryPoints; i++ ) | |
|       entry_point_offset_minus1[ i ] | u(v) |
|   } | |
|   if( slice_header_extension_present_flag) { | |
|     slice_header_extension_length | ue(v) |
|     for( i = 0; i < slice_header_extension_length; i++) | |
|       slice_header_extension_data_byte[ i ] | u(8) |
|   } | |
|   byte_alignment( ) | |
| } | |

BRIEF SUMMARY OF THE INVENTION

Embodiments of image or video processing methods for an image or video encoding or decoding system receive input data associated with a current picture or a current slice in the current picture, determine whether the current picture is a monochrome picture, conditionally signal or parse chrominance (chroma) deblocking parameters for the current picture or current slice depending on whether the current picture is a monochrome picture; and encode or decode the current picture or current slice. The chroma deblocking parameters are used in a deblocking filter operation applied to chroma components of the current picture or current slice when the current picture is not a monochrome picture. Embodiments of the image or video encoding or decoding system only signal or parse the chroma deblocking parameters for the current picture or current slice when the current picture is not a monochrome picture, and skip signaling or skip parsing the chroma deblocking parameters for the current picture or current slice when the current picture is a monochrome picture. In some embodiments, the deblocking filter operation is only applied to luminance (luma) component when the current picture is a monochrome picture. Some examples of the chroma deblocking parameters comprise deblocking offsets beta and tC for the chroma components Cb and Cr.

In some embodiments, the current picture is determined to be a monochrome picture according to a value of a Picture Parameter Set (PPS) level chroma tool offset present flag signaled in a PPS associated with the current picture, for example, the chroma deblocking parameters are not signaled in the PPS or parsed from the PPS when the PPS level chroma tool offset present flag is equal to 0. In one embodiment, the PPS level chroma tool offset present flag is set to 0 when a syntax element ChromaArrayType signaled in a corresponding Sequence Parameter Set (SPS) is equal to 0. In some other embodiments, the current picture is determined to be a monochrome picture depending on a value of a syntax element ChromaArrayType signaled in a SPS. For example, the chroma deblocking parameters are not signaled in a Picture Header (PH) associated with the current picture when the syntax element ChromaArrayType is equal to 0, and the chroma deblocking parameters are allowed to be signaled in the PH when the syntax element ChromaArrayType is not equal to 0. In another example, the chroma deblocking parameters are not signaled in a Slice Header (SH) associated with the current slice when the syntax element ChromaArrayType is equal to 0, and the chroma deblocking parameters are allowed to be signaled in the SH when the syntax element ChramArrayType is not equal to 0.

Embodiments of the image or video processing methods for an image or video encoding or decoding system receive input video data associated with a current picture or a current slice in the current picture, determine a syntax element used to indicate derivation of chroma deblocking parameters for the current picture or current slice, derive the chroma deblocking parameters, apply a deblocking filter operation to chroma components of the current picture or current slice using the chroma deblocking parameters, and encode or decode the current picture or current slice. The chroma deblocking parameters for the current picture or current slice are allowed to be explicitly signaled or parsed, or are implicitly inferred according to a value of the syntax element. In some embodiments, the value of the syntax element is allow to be inferred to a number greater than 0 for the current picture or the current slice in the current picture when the current picture is not a monochrome picture. For example, the syntax element is signaled in a PPS or PH associated with the current picture or a SH associated with the current slice.

Embodiments of the image or video processing method determine whether the chroma deblocking parameters are allowed to be explicitly signaled in or parsed from a PPS, PH, or SH syntax structure, or the chroma deblocking parameters are implicitly inferred according to the value of the syntax element signaled in the PPS, PH, or SH. For example, the chroma deblocking parameters are implicitly inferred to 0, or implicitly inferred from corresponding luma deblocking parameters, or implicitly inferred from another syntax structure when the chroma deblocking parameters are not explicitly signaled.

In some embodiments, the syntax element is signaled in or parsed from a PPS associated with the current picture, and the chroma deblocking parameters are allowed to be explicitly signaled in or parsed from the PPS when the value of the syntax element is equal to a first value, and the chroma deblocking parameters are not present in the PPS when the value of the syntax element is less than a second value different from the first value. In some other embodiments, the chroma deblocking parameters in the PPS are implicitly inferred to be equal to corresponding luma deblocking parameters in the PPS.

In some other embodiments, the chroma deblocking parameters for the current picture or current slice are allowed to be explicitly signaled in or parsed from a PH or SH when a value of the syntax element is equal to a first value, and the chroma deblocking parameters are not present in the PH or SH when the value of the syntax element is equal to a second value different from the first value. In an example of signaling the syntax element in the PH associated with the current picture, the chroma deblocking parameters for the current picture are implicitly inferred to be equal to chroma deblocking parameters signaled in a PPS associated with the current picture when the value of the syntax element is equal to a first value and the chroma deblocking parameters are not present in the PH, and the chroma deblocking parameters for the current picture are implicitly inferred to be equal to corresponding luma deblocking parameters signaled in the PH associated with the current picture when the value of the syntax element is equal to a second value different from the first value. In an example of signaling the syntax element in the SH associated with the current slice, the chroma deblocking parameters for the current slice are implicitly inferred to be equal to chroma deblocking parameters signaled in the PH associated with the current picture when the value of the syntax element is equal to a first value and the chroma deblocking parameters are not present in the SH, and the chroma deblocking parameters for the current slice are implicitly inferred to be equal to corresponding luma deblocking parameters signaled in the SH associated with the current slice when the value of the syntax element is equal to a second value different from the first value.

Aspects of the disclosure further provide an apparatus for an image or video encoding or decoding system. Some embodiments of the apparatus receive input data associated with a current picture or current slice in the current picture, determine whether the current picture is a monochrome picture, conditionally signaling or parsing chroma deblocking parameters for the current picture or current slice depending on whether the current picture is a monochrome picture, and encode or decode the current picture or current slice. The chroma deblocking parameters are used in a deblocking filter operation applied to chroma components of the current picture or current slice when the current picture is not a monochrome picture. Some other embodiments of the apparatus receive input data associated with a current picture or a current slice in the current picture, determine a syntax element used to indicate derivation of chroma deblocking parameters for the current picture or current slice, explicitly signal or parse the chroma deblocking parameters for the current picture or current slice, or implicitly infer the chroma deblocking parameters for the current picture or current slice according to a value of the syntax element, apply a deblocking filter operation to chroma components of the current picture or current slice using the chroma deblocking parameters, and encode or decode the current picture or current slice.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE INVENTION

Figure 1:
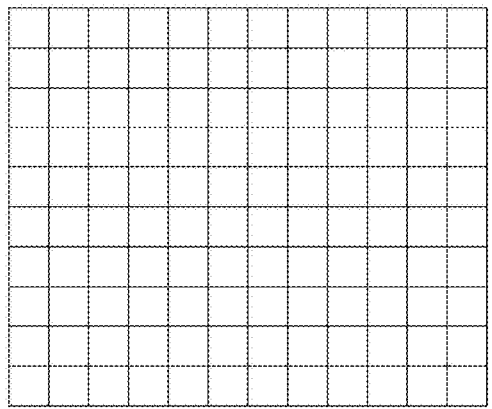
FIG. 1 illustrates an example of partitioning a video picture into multiple CTUs.
Figure 2:
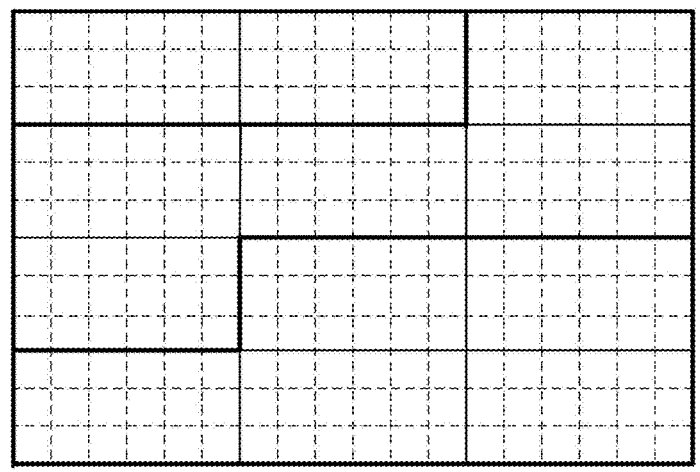
FIG. 2 illustrates an example of applying raster-scan slice partitioning to divide a picture into 12 tiles and 3 raster-scan slices.
Figure 3:
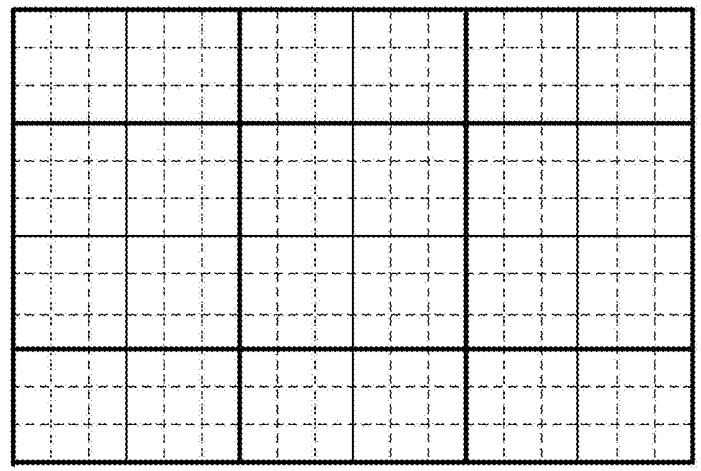
FIG. 3 illustrates an example of applying rectangular slice partitioning to divide a picture, into 24 tiles and 9 rectangular slices.
Figure 4:
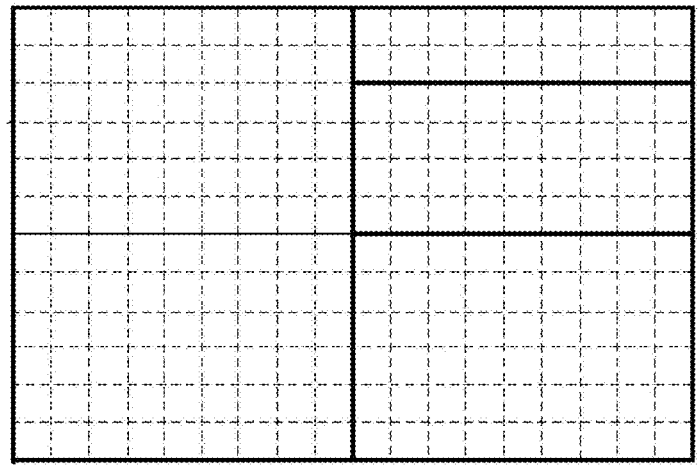
FIG. 4 illustrates an example of partitioning a picture into 4 tiles and 4 rectangular slices.
Figure 5:
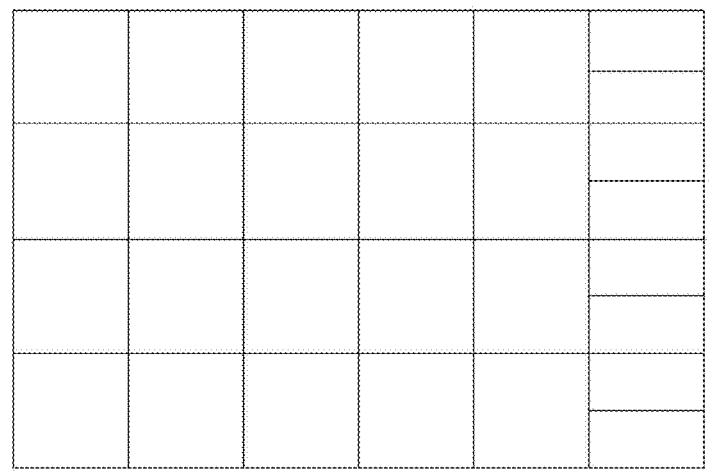
FIG. 5 illustrates an example of partitioning a picture into 28 subpictures.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

Conditionally Signaling Chroma Deblocking Parameters Embodiments of the present invention reduce the signaling overhead by conditionally signaling loop filter parameters for chroma components. For example, chroma deblocking parameters are conditionally signaled or parsed. Some examples of the chroma deblocking parameters include deblocking offsets beta ($\beta$) and tC for chroma components in image or video data. In some preferred embodiments, the chroma deblocking parameters for a current picture are not signaled or parsed when the current picture is a monochrome picture. For example, signaling of chroma deblocking parameters in a Picture Parameter Set (PPS) depends on a PPS-level chroma tool offset present flag pps_chroma_tool_offsets_present_flag signaled in the PPS. Table 4 is an exemplary PPS syntax table showing this example of conditionally signaling chroma deblocking parameters in the PPS. In the exemplary PPS syntax table shown in Table 4, the chroma deblocking parameters include pps_cb_beta_offset_div2, pps_cb_tc_offset_div2, pps_cr_beta_offset_div2, and pps_cr_tc_offset_div2, and these chroma deblocking parameters are allowed to be signaled in the PPS when the PPS-level chroma tool offset present flag pps_chroma_tool_offsets_present_flag is equal to 1. This PPS-level chroma tool offset present flag pps_chroma_tool_offsets_present_flag indicates whether the picture associated with the PPS is a monochrome picture, for example, the picture associated with the PPS is a monochrome pictures when this PPS-level chroma tool offset present flag is equal to 0. In one embodiment, the value of the PPS-level chroma tool offset present flag is allowed to be inferred to a number greater than 0 when the picture is not a monochrome picture. The PPS-level chroma tool present flag equals to 1 specifying that chroma tool offsets related syntax elements are allowed to be present in the PPS RBSP syntax structure, and this flag equals to 0 specifying that chroma tool offsets related syntax elements are not present in the PPS RBSP syntax structure. The value of this flag pps_chroma_tool_offsets_present_flag shall be equal to 0 when a syntax element ChromaArrayType is equal to 0. The syntax element ChromaArrayType is signaled in a corresponding Sequence Parameter Set (SPS) indicating whether pictures associated with the SPS are monochrome pictures. In this embodiment, the pictures associated with the SPS are monochrome pictures when the syntax element ChromaArrayType is equal to 0.

TABLE 4

| | Descriptor |
|---|---|
| pic_parameter_set_rbsp( ) { | |
|   pps_chroma_tool_offsets_present_flag | u(1) |
|   if( pps_chroma_tool_offsets_present_flag ) { | |
|     pps_cb_qp_offseta | se(v) |
|     pps_cr_qp_offset | se(v) |
|     pps_joint_cbcr_qp_offset_present_flag | u(1) |
|     if( pps_joint_cbcr_qp_offset_present_flag ) | |
|       pps_joint_cbcr_qp_offset_value | se(v) |
|     pps_slice_chroma_qp_offsets_present_flag | u(1) |
|     pps_cu_chroma_qp_offset_list_enabled_flag | u(1) |
|   } | |
| ... | |
|   deblocking_filter_control_present_flag | u(1) |
|   if( deblocking_filter_control_present_flag ) { | |
|     deblocking_filter_override_enabled_flag | u(1) |
|     pps_deblocking_filter_disabled_flag | u(1) |
|     if( !pps_deblocking_filter_disabled_flag ) { | |
|       pps_beta_offset_div2 | se(v) |

TABLE 4-continued

| | Descriptor |
|---|---|
| pps_tc_offset_div2 | se(v) |
| if( pps_chroma_tool_offsets_present_flag ) { | |
|   pps_cb_beta_offset_div2 | se(v) |
|   pps_cb_tc_offset_div2 | se(v) |
|   pps_cr_beta_offset_div2 | se(v) |
|   pps_cr_tc_offset_div2 | se(v) |
| } | |
| } | |
| } | |
| ... | |

In some other examples, signaling of chroma deblocking parameters in a Picture Header (PH) or Slice Header (SH) depends on a syntax element ChromaArrayType signaled in a Sequence Parameter Set (SPS). Table 5 and Table 6 are exemplary picture header syntax table and slice header syntax table demonstrating examples of conditionally signaling chroma deblocking parameters in the PH and SH respectively. As shown in Table 5, the chroma deblocking parameters ph_cb_beta_offset_div2, ph_cb_tc_offset_div2, ph_cr_beta_offset_div2, and ph_cr_tc_offset_div2 are allowed to be signaled in the PH when the syntax element ChromaArrayType is not equal to 0. The syntax element ChromaArrayType signaled in a SPS equals to 0 specifying the pictures corresponding to the SPS are monochrome pictures. Similarly, the chroma deblocking parameters slice_cb_beta_offset_div2, slice_cb_tc_offset_div2, slice_cr_beta_offset_div2, and slice_cr_tc_offset_div2 are allowed to be signaled in the SH when the syntax element ChromaArrayType is not equal to 0.

TABLE 5

| | Descriptor |
|---|---|
| picture_header_structure( ) { | |
| ... | |
|   if( deblocking_filter_override_enabled_flag && | |
|   dbf_info_in_ph_flag ) { | |
|     ph_deblocking_filter_override_flag | u(1) |
|     if( ph_deblocking_filter_override_flag ) { | |
|       ph_deblocking_filter_override_flag | u(1) |
|       if( !ph_deblocking_filter_disabled_flag ) { | |
|         ph_beta_offset_div2 | se(v) |
|         ph_tc_offset_div2 | se(v) |
|         if( ChromaArrayType != 0 ) { | |
|           ph_cb_beta_offset_div2 | se(v) |
|           ph_cb_tc_offset_div2 | se(v) |
|           ph_cr_beta_offset_div2 | se(v) |
|           ph_cr_tc_offset_div2 | se(v) |
|         } | |
|       } | |
|     } | |
|   } | |
| } | |
| ... | |

TABLE 6

| | Descriptor |
|---|---|
| slice_header( ) { | |
| ... | |
|   if( deblocking_filter_override_enabled_flag && | |
|   !dbf_info_in_ph_flag ) | |
|     slice_deblocking_filter_override_flag | u(1) |
|   if( slice_deblocking_filter_override_flag ) { | |
|     slice_deblocking_filter_disabled_flag | u(1) |
|     if( !slice_deblocking_filter_disabled_flag ) { | |
|       slice_beta_offset_div2 | se(v) |

TABLE 6-continued

| | Descriptor |
|---|---|
|       slice_tc_offset_div2 | se(v) |
|       if( ChromaArrayType != 0 ) { | |
|         slice_cb_beta_offset_div2 | se(v) |
|         slice_cb_tc_offset_div2 | se(v) |
|         slice_cr_beta_offset_div2 | se(v) |
|         slice_cr_tc_offset_div2 | se(v) |
|       } | |
|     } | |
|   } | |
| ... | |

A Flag Indicating Present of Chroma Deblocking Offset Parameters In some embodiments of the present invention, a flag is specifically signaled to indicate the present of chroma deblocking offset parameters. The chroma deblocking offset parameters are also referred to as chroma deblocking parameters in the disclosure. In one embodiment, this flag is signaled when a current picture is not a monochrome picture. For example, a PPS-level flag pps_chroma_deblocking_offsets_present_flag is signaled in a PPS to indicate the present of chroma deblocking offset parameters in the PPS when the current picture is not a monochrome picture. In this example, chroma deblocking parameters are adaptively signaled in the PPS depending on a value of this PPS-level flag pps_chroma_deblocking_offsets_present_flag as shown in Table 7. This PPS-level flag equals to 1 specifying that chroma deblocking offsets related syntax elements are allowed to be present in the PPS RBSP syntax structure, and equals to 0 specifying that chroma deblocking offsets related syntax elements are not present in the PPS RBSP syntax structure. The value of this PPS-level pps_chroma_deblocking_offsets_present_flag shall be equal to 0 when the SPS-level syntax element ChromaArrayType is equal to 0. In some other examples, a PH-level flag or a SH-level flag is signaled to indicate the present of chroma deblocking offset parameters in the PH or SH respectively. Corresponding modifications in the PH and SH are shown in Table 8 and 9 respectively. In Table 8, a PH-level flag ph_chroma_deblocking_offsets_present_flag equals to 1 specifying that chroma deblocking offsets related syntax elements are allowed to be present in the PH RBSP syntax structure, and this flag equals to 0 specifying that chroma deblocking offsets related syntax elements are not present in the PH RBSP syntax structure. The value of this PH-level flag shall be equal to 0 when it is not present. Similarly, in Table 9, a SH-level flag slice_chroma_deblocking_offsets_present_flag equals to 1 specifying that chroma deblocking offsets related syntax elements are allowed to be present in the slice syntax structure, and this flag equals to 0 specifying that chroma deblocking offsets related syntax elements are not present in the slice syntax structure. The value of this SH-level flag shall be equal to 0 when it is not present.

TABLE 7

| | Descriptor |
|---|---|
| pic_parameter_set_rbsp( ) { | |
|   pps_chroma_tool_offsets_present_flag | u(1) |
|   if( pps_chroma_tool_offsets_present_flag ) { | |
|     pps_cb_qp_offset | se(v) |
|     pps_cr_qp_offset | se(v) |
|     pps_joint_cbcr_qp_offset_present_flag | u(1) |
|     if( pps_joint_cbcr_qp_offset_present_flag ) | |
|       pps_joint_cbcr_qp_offset_value | se(v) |

TABLE 7-continued

| | Descriptor |
|---|---|
|     pps_slice_chroma_qp_offsets_present_flag | u(1) |
|     pps_cu_chroma_qp_offset_list_enabled_flag | u(1) |
|   } | |
|   ... | |
|   deblocking_filter_control_present_flag | u(1) |
|   if( deblocking_filter_control_present_flag ) { | |
|     deblocking_filter_override_enabled_flag | u(1) |
|     pps_deblocking_filter_disabled_flag | u(1) |
|     if( !pps_deblocking_filter_disabled_flag ) { | |
|       pps_beta_offset_div2 | se(v) |
|       pps_tc_offset_div2 | se(v) |
|       pps_chroma_deblocking_offsets_present_flag | u(1) |
|       if( pps_chroma_deblocking_offsets_present_flag ) { | |
|         pps_cb_beta_offset_div2 | se(v) |
|         pps_cb_tc_offset_div2 | se(v) |
|         pps_cr_beta_offset_div2 | se(v) |
|         pps_cr_tc_offset_div2 | se(v) |
|       } | |
|     } | |
|   } | |
| ... | |

TABLE 8

| | Descriptor |
|---|---|
| picture_header_structure( ) { | |
|   ... | |
|   if( deblocking_filter_override_enabled_flag && dbf_info_in_ph_flag ) { | |
|     ph_deblocking_filter_override_flag | u(1) |
|     if( ph_deblocking_filter_override_flag ) { | |
|       ph_deblocking_filter_disabled_flag | u(1) |
|       if( !ph_deblocking_filter_disabled_flag ) { | |
|         ph_beta_offset_div2 | se(v) |
|         ph_tc_offset_div2 | se(v) |
|         if( ChromaArrayType != 0 ) { | |
|           ph_chroma_deblocking_offsets_present_flag | u(1) |
|           if( ph_chroma_deblocking_offsets_present_flag ) { | |
|             ph_cb_beta_offset_div2 | se(v) |
|             ph_cb_tc_offset_div2 | se(v) |
|             ph_cr_beta_offset_div2 | se(v) |
|             ph_cr_tc_offset_div2 | se(v) |
|           } | |
|         } | |
|       } | |
|     } | |
|   } | |
|   ... | |

TABLE 9

| | Descriptor |
|---|---|
| slice_header( ) { | |
|   ... | |
|   if( deblocking_filter_override_enabled_flag && !dbf_info_in_ph_flag ) | |
|     slice_deblocking_filter_override_flag | u(1) |
|   if( slice_deblocking_filter_override_flag ) { | |
|     slice_deblocking_filter_disabled_flag | u(1) |
|     if( !slice_deblocking_filter_disabled_flag ) { | |
|       slice_beta_offset_div2 | se(v) |
|       slice_tc_offset_div2 | se(v) |
|       if( ChromaArrayType != 0 ) { | |
|         slice_chroma_deblocking_offsets_present_flag | u(1) |
|         if( slice_chroma_deblocking_offsets_present_flag ) { | |
|           slice_cb_beta_offset_div2 | se(v) |
|           slice_cb_tc_offset_div2 | se(v) |

TABLE 9-continued

| | Descriptor |
|---|---|
|           slice_cr_beta_offset_div2 | se(v) |
|           slice_cr_tc_offset_div2 | se(v) |
|         } | |
|       } | |
|     } | |
|   } | |
| ... | |

Implicitly Inferring Chroma Deblocking Offset Parameters A syntax element is signaled to indicate the derivation of chroma deblocking offset parameters according to some embodiments of the present invention. This syntax element is signaled for a current picture when the current picture is not a monochrome picture. A value of the syntax element is allowed to be inferred to a number greater than 0 when the current picture is not a monochrome picture according to some embodiments. Chroma deblocking offset parameters can be explicitly signaled in a PPS, PH, or SH syntax structure, or implicitly inferred according to the value of this syntax element. For example, chroma deblocking offset parameters can be implicitly inferred to 0, or implicitly inferred from corresponding luma deblocking offset parameters, or implicitly inferred from chroma deblocking offset parameters signaled in another syntax structure. In one example, chroma deblocking parameters are adaptively signaled in a PPS depending on a syntax element pps_chroma_deblocking_offsets_present_idc as shown in Table 10. The syntax element pps_chroma_deblocking_offsets_present_idc equals to 2 specifying that chroma deblocking offsets related syntax elements are present in the PPS RBSP syntax structure. Chroma deblocking offsets related syntax elements are not present in the PPS RBSP syntax structure when the value of pps_chroma_deblocking_offsets_present_idc is less than 2. In some other embodiments, the syntax element pps_chroma_deblocking_offsets_present_idc equals to a first value specifying that chroma deblocking offsets related syntax elements are present in the PPS RBSP syntax structure; chroma deblocking offsets related syntax elements are not present in the PPS RBSP syntax structure when the value of pps_chroma_deblocking_offsets_present_idc is equal to a value other than the first value. The value of pps_chroma_deblocking_offsets_present_idc shall be equal to 0 when the SPS-level syntax element ChromaArrayType is equal to 0. The syntax elements pps_cb_beta_offset_div2 and pps_cb_tc_offset_div2 specify the default deblocking parameter offsets for β and tC (divided by 2) that are applied to the chroma Cb component for slices referring to the PPS, unless the default deblocking parameter offsets are overridden by the deblocking parameter offsets present in the picture headers or the slice headers of the slices referring to the PPS. The values of pps_cb_beta_div2 and pps_cb_tc_offset_div2 shall both be in the range of −12 to 12, inclusive, and when not present in the PPS, the values of pps_cb_beta_offset_div2 and pps_cb_tc_offset_div2 are both inferred to be equal to 0 when the syntax element pps_chroma_deblocking_offset_present_idc is equal to 0. Otherwise, the values of pps_cb_beta_offset_div2 and pps_cb_tc_offset_div2 are inferred to be equal to corresponding luma deblocking parameters pps_beta_offset_div2 and pps_tc_offset_div2 when the syntax element pps_chroma_deblocking_offsets_present_idc is equal to 1. In some other embodiments, when pps_cb_beta_div2 and pps_cb_tc_offset_div2 are not present in the PPS and the syntax element pps_chroma_deblocking_offset_present_idc is equal to a first value, the values of pps_cb_beta_offset_div2 and pps_cb_tc_offset_div2 are both inferred to be equal to 0; otherwise, the values of pps_cb_beta_offset_div2 and pps_cb_tc_offset_div2 are inferred to be equal to corresponding luma deblocking parameters pps_beta_offset_div2 and pps_tc_offset_div2 when the syntax element pps_chroma_deblocking_offsets_present_idc is equal to a second value different from the first value. Similarly, the syntax elements pps_cr_beta_offset_div2 and pps_cr_tc_offset_div2 specify the default deblocking parameter offsets for β and tC (divided by 2) that are applied to the chroma Cr component for slices referring to the PPS, unless the default deblocking parameter offsets are overridden by the deblocking parameter offsets present in the picture headers or the slice headers of the slices referring to the PPS. The values of pps_cr_beta_div2 and pps_cr_tc_offset_div2 shall both be in the range of −12 to 12, inclusive, and when not present in the PPS, the values of pps_cr_beta_offset_div2 and pps_cr_tc_offset_div2 are both inferred to be equal to 0 when the syntax element pps_chroma_deblocking_offset_present_idc is equal to 0. Otherwise, the values of pps_cr_beta_offset_div2 and pps_cr_tc_offset_div2 are inferred to be equal to corresponding luma deblocking parameters pps_beta_offset_div2 and pps_tc_offset_div2 when the syntax element pps_chroma_deblocking_offsets_present_idc is equal to 1.

TABLE 10

| | Descriptor |
|---|---|
| pic_parameter_set_rbsp( ) { | |
|   pps_chroma_tool_offsets_present_flag | u(1) |
|   if( pps_chroma_tool_offsets_present_flag ) { | |
|     pps_cb_qp_offset | se(v) |
|     pps_cr_qp_offset | se(v) |
|     pps_joint_cbcr_qp_offset_present_flag | u(1) |
|     if( pps_joint_cbcr_qp_offset_present_flag ) | |
|       pps_joint_cbcr_qp_offset_value | se(v) |
|     pps_slice_chroma_qp_offsets_present_flag | u(1) |
|     pps_cu_chroma_qp_offset_list_enabled_flag | u(1) |
|   } | |
|   ... | |
|   deblocking_filter_control_present_flag | u(1) |
|   if( deblocking_filter_control_present_flag ) { | |
|     deblocking_filter_override_enabled_flag | u(1) |
|     pps_deblocking_filter_disabled_flag | u(1) |
|     if( !pps_deblocking_filter_disabled_flag ) { | |
|       pps_beta_offset_div2 | se(v) |
|       pps_tc_offset_div2 | se(v) |
|       pps_chroma_deblocking_offsets_present_idc | u(2) |
|       if( pps_chroma_deblocking_offsets_present_idc == 2 ) { | |
|         pps_cb_beta_offset_div2 | se(v) |
|         pps_cb_tc_offset_div2 | se(v) |
|         pps_cr_beta_offset_div2 | se(v) |
|         pps_cr_tc_offset_div2 | se(v) |
|       } | |
|     } | |
|   } | |
|   ... | |

The corresponding modifications in the PH and SH are demonstrated in Table 11 and Table 12 respectively. In Table 11, a syntax element ph_chroma_deblocking_offsets_present_idc with a value equals to 2 specifying that chroma deblocking offsets related syntax elements are allowed to be present in the PH RBSP syntax structure, and the syntax element ph_chroma_deblocking_offsets_present_idc with a value less than 2 specifying that chroma deblocking offsets related syntax elements are not present in the PH RBSP syntax structure. The value of ph_chroma_deblocking_offsets_present_idc shall be equal to 0 when this syntax element is not present. In some other embodiments, the syntax element ph_chroma_deblocking_offsets_present_idc with a value equals to a first value specifying that chroma deblocking offsets related syntax elements are allowed to be present in the PH RBSP syntax structure, and the syntax element ph_chroma_deblocking_offsets_present_idc with a value other than the first value specifying that chroma deblocking offsets related syntax elements are not present in the PH RBSP syntax structure. The value of ph_chroma_deblocking_offsets_present_idc shall be equal to a second value different from the first value when this syntax element is not present. The two syntax elements ph_cb_beta_offset_div2 and ph_cb_tc_offset_div2 in Table 11 specify the deblocking parameter offsets for β and tC (divided by 2) that are applied to the chroma Cb component for the slices associated with the PH. The values of ph_cb_beta_offset_div2 and ph_cb_tc_offset_div2 shall both be in the range of −12 to 12, inclusive. When these two syntax elements are not present and if the syntax element ph_chroma_deblocking_offsets_present_idc is equal to 0, the values of ph_cb_beta_offset_div2 and ph_cb_tc_offset_div2 are inferred to be equal to PPS level syntax elements pps_cb_beta_offset_div2 and pps_cb_tc_offset_div2, respectively. Otherwise, if the syntax element ph_chroma_deblocking_offsets_present_idc is equal to 1, the values of ph_cb_beta_offset_div2 and ph_cb_tc_offset_div2 are inferred to be equal to corresponding luma deblocking parameters such as luma component syntax elements ph_beta_offset_div2 and ph_tc_offset_div2, respectively. In some other embodiments, when these two syntax elements are not present and if the syntax element ph_chroma_deblocking_offsets_present_idc is equal to a first value, the values of ph_cb_beta_offset_div2 and ph_cb_tc_offset_div2 are inferred to be equal to PPS level syntax elements pps_cb_beta_offset_div2 and pps_cb_tc_offset_div2, respectively; otherwise, if the syntax element ph_chroma_deblocking_offsets_present_idc is equal to a second value different from the first value, the values of ph_cb_beta_offset_div2 and ph_cb_tc_offset_div2 are inferred to be equal to corresponding luma deblocking parameters such as luma component syntax elements ph_beta_offset_div2 and ph_tc_offset_div2, respectively. The luma component syntax elements ph_beta_offset_div2 and ph_tc_offset_div2 are signaled in the PH syntax structure.

Similarly, the syntax elements ph_cr_beta_ofset_div2 and ph_cr_tc_offset_div2 in Table 11 specify the deblocking parameter offsets for β and tC (divided by 2) that are applied to the chroma Cr component for the slices associated with the PH. The values of ph_cr_beta_offset_div2 and ph_cr_tc_offset_div2 shall both be in the range of −12 to 12, inclusive. When these two syntax elements are not present and if the syntax element ph_chroma_deblocking_offsets_present_idc is equal to 0, the values of ph_cr_beta_offset_div2 and ph_cr_tc_offset_div2 are inferred to be equal to PPS level syntax elements pps_cr_beta_offset_div2 and pps_cr_tc_offset_div2, respectively. Otherwise, if the syntax element ph_chroma_deblocking_offsets_present_idc is equal to 1, the values of ph_cr_beta_offset_div2 and ph_cr_tc_offset_div2 are inferred to be equal to corresponding luma component syntax elements ph_beta_offset_div2 and ph_tc_offset_div2, respectively.

TABLE 11

| | Descriptor |
|---|---|
| picture_header_structure( ) { | |
|   ... | |
|   if( deblocking_filter_override_enabled_flag && dbf_info_in_ph_flag ) { | |

TABLE 11-continued

| | Descriptor |
|---|---|
| ph_deblocking_filter_override_flag | u(1) |
| if( ph_deblocking_filter_override_flag ) { | |
|   ph_deblocking_filter_disabled_flag | u(1) |
|   if( !ph_deblocking_filter_disabled_flag ) { | |
|     ph_beta_offset_div2 | se(v) |
|     ph_tc_offset_div2 | se(v) |
|     if( ChromaArrayType != 0 ) { | |
|       ph_chroma_deblocking_offsets_present_idc | u(2) |
|       if( ph_chroma_deblocking_offsets_present_idc == 2 ) { | |
|         ph_cb_beta_offset_div2 | se(v) |
|         ph_cb_tc_offset_div2 | se(v) |
|         ph_cr_beta_offset_div2 | se(v) |
|         ph_cr_tc_offset_div2 | se(v) |
|       } | |
|     } | |
|   } | |
| } | |
| if( picture_header_extension_present_flag ) { | |

The corresponding modifications in the SH are demonstrated in Table 12, where a syntax element slice_chroma_deblocking_offsets_present_idc with a value equals to 2 specifying that chroma deblocking offsets related syntax elements are allowed to be present in the slice syntax structure, and the syntax element slice_chroma_deblocking_offsets_present_idc with a value less than 2 specifying that chroma deblocking offsets related syntax elements are not present in the slice syntax structure. The value of slice_chroma_deblocking_offsets_present_idc shall be equal to 0 when this syntax element is not present. In some other embodiments, the syntax element slice_chroma_deblocking_offsets_present_idc with a value equals to a first value specifying that chroma deblocking offsets related syntax elements are allowed to be present in the slice syntax structure, and the syntax element slice_chroma_deblocking_offsets_present_idc with a value other than the first value specifying that chroma deblocking offsets related syntax elements are not present in the slice syntax structure, where the value of slice_chroma_deblocking_offsets_present_idc shall be equal to a second value different from the first value when this syntax element is not present. The two syntax elements slice_cb_beta_offset_div2 and slice_cb_tc_offset_div2 in Table 12 specify the deblocking parameter offsets for β and tC (divided by 2) that are applied to the chroma Cb component for the current slice. The values of slice_cb_beta_offset_div2 and slice_cb_tc_offset_div2 shall both be in the range of −12 to 12, inclusive. When these two syntax elements are not present and if the syntax element slice_chroma_deblocking_offsets_present_idc is equal to 0, the values of slice_cb_beta_offset_div2 and slice_cb_tc_offset_div2 are inferred to be equal to PH level syntax elements ph_cb_beta_offset_div2 and ph_cb_tc_offset_div2, respectively. Otherwise, if the syntax element slice_chroma_deblocking_offsets_present_idc is equal to 1, the values of slice_cb_beta_offset_div2 and slice_cb_tc_offset_div2 are inferred to be equal to corresponding luma component syntax elements slice_beta_offset_div2 and slice_tc_offset_div2, respectively. In some other embodiments, when these two syntax elements are not present and if the syntax element slice_chroma_deblocking_offsets_present_idc is equal to a first value, the values of slice_cb_beta_offset_div2 and slice_cb_tc_offset_div2 are inferred to be equal to PH level syntax elements ph_cb_beta_offset_div2 and ph_cb_tc_offset_div2, respectively; otherwise, if the syntax element slice_chroma_deblocking_offsets_present_idc is equal to a second value different from the first value, the values of slice_cb_beta_offset_div2 and slice_cb_tc_offset_div2 are inferred to be equal to corresponding luma component syntax elements slice_beta_offset_div2 and slice_tc_offset_div2, respectively. Similarly, the syntax elements slice_cr_beta_ofset_div2 and slice_cr_tc_offset_div2 in Table 12 specify the deblocking parameter offsets for β and tC (divided by 2) that are applied to the chroma Cr component for the current slice. The values of slice_cr_beta_offset_div2 and slice_cr_tc_offset_div2 shall both be in the range of −12 to 12, inclusive. When these two syntax elements are not present and if the syntax element slice_chroma_deblocking_offsets_present_idc is equal to 0, the values of slice_cr_beta_offset_div2 and slice_cr_tc_offset_div2 are inferred to be equal to PH level syntax elements ph_cr_beta_offset_div2 and ph_cr_tc_offset_div2, respectively. Otherwise, if the syntax element slice_chroma_deblocking_offsets_present_idc is equal to 1, the values of slice_cr_beta_offset_div2 and slice_cr_tc_offset_div2 are inferred to be equal to corresponding luma component syntax elements slice_beta_offset_div2 and slice_tc_offset_div2, respectively.

TABLE 12

| | Descriptor |
|---|---|
| slice_header( ) { | |
| ... | |
|   if( deblocking_filter_override_enabled_flag && !dbf_info_in_ph_flag ) | |
|     slice_deblocking_filter_override_flag | u(1) |
|   if( slice_deblocking_filter_override_flag ) { | |
|     slice_deblocking_filter_disabled_flag | u(1) |
|     if( !slice_deblocking_filter_disabled_flag ) { | |
|       slice_beta_offset_div2 | se(v) |
|       slice_tc_offset_div2 | se(v) |
|       if( ChromaArrayType != 0 ) { | |
|         slice_chroma_deblocking_offsets_present_idc | u(2) |
|         if( slice_chroma_deblocking_offsets_present_idc ) { | |
|           slice_cb_beta_offset_div2 | se(v) |
|           slice_cb_tc_offset_div2 | se(v) |
|           slice_cr_beta_offset_div2 | se(v) |
|           slice_cr_tc_offset_div2 | se(v) |
|         } | |
|       } | |
|     } | |
|   } | |
| ... | |

In some embodiments of the present invention, chroma deblocking parameters are not present in a specific syntax structure if a syntax element signaled in the specific syntax structure is equal to 0. In an embodiment of signaling a syntax element in a PPS associated with a current picture or parsing a syntax element from a PPS associated with a current picture, chroma deblocking parameters for the PPS are not present in the PPS when a value of the syntax element is equal to 0. The chroma deblocking parameters for the PPS are allowed to be explicitly signaled in or parsed from the PPS when the value of the syntax element is equal to 1. For example, the chroma deblocking parameters for the PPS are implicitly inferred to be equal to corresponding PPS level luma deblocking parameters when the value of the syntax element is equal to 0. In an embodiment of signaling a syntax element in a PH associated with a current picture or parsing a syntax element from a PH associated with a current picture, chroma deblocking parameters for the PH are allowed to be explicitly signaled in or parsed from the PH when a value of the syntax element is equal to 1, and the chroma deblocking parameters for the PH are not present in the PH when the value of the syntax element is equal to 0. For example, the chroma deblocking parameters for the current picture are implicitly inferred to be equal to chroma deblocking parameters signaled in a PPS associated with the current picture when the value of the syntax element is equal to 1 and the chroma deblocking parameters are not present in the PH. The chroma deblocking parameters for the current picture are implicitly inferred to be equal to corresponding luma deblocking parameters signaled in the PH associated with the current picture when the value of the syntax element is equal to 0. In an embodiment of signaling a syntax element in a SH associated with a current slice in a current picture or parsing a syntax element from a SH associated with a current slice in a current picture, chroma deblocking parameters for the SH are allowed to be explicitly signaled in or parsed from the SH when a value of the syntax element is equal to 1, and the chroma deblocking parameters for the SH are not present in the SH when the value of the syntax element is equal to 0. For example, the chroma deblocking parameters for the current slice are implicitly inferred to be equal to chroma deblocking parameters signaled in a PH associated with the current picture when the value of the syntax element is equal to 1 and the chroma deblocking parameters are not present in the SH. The chroma deblocking parameters for the current slice are implicitly inferred to be equal to corresponding luma deblocking parameters signaled in the SH associated with the current slice when the value of the syntax element is equal to 0.

In some embodiments, the syntax elements of deblocking filter parameters in the above described embodiments or examples can be combined with each other. For example, some tool parameters syntax changes are from one particular embodiment and some other tool parameters syntax could from other embodiments. In another example, tool parameters syntax could be combined from different embodiments.

Figure 6:
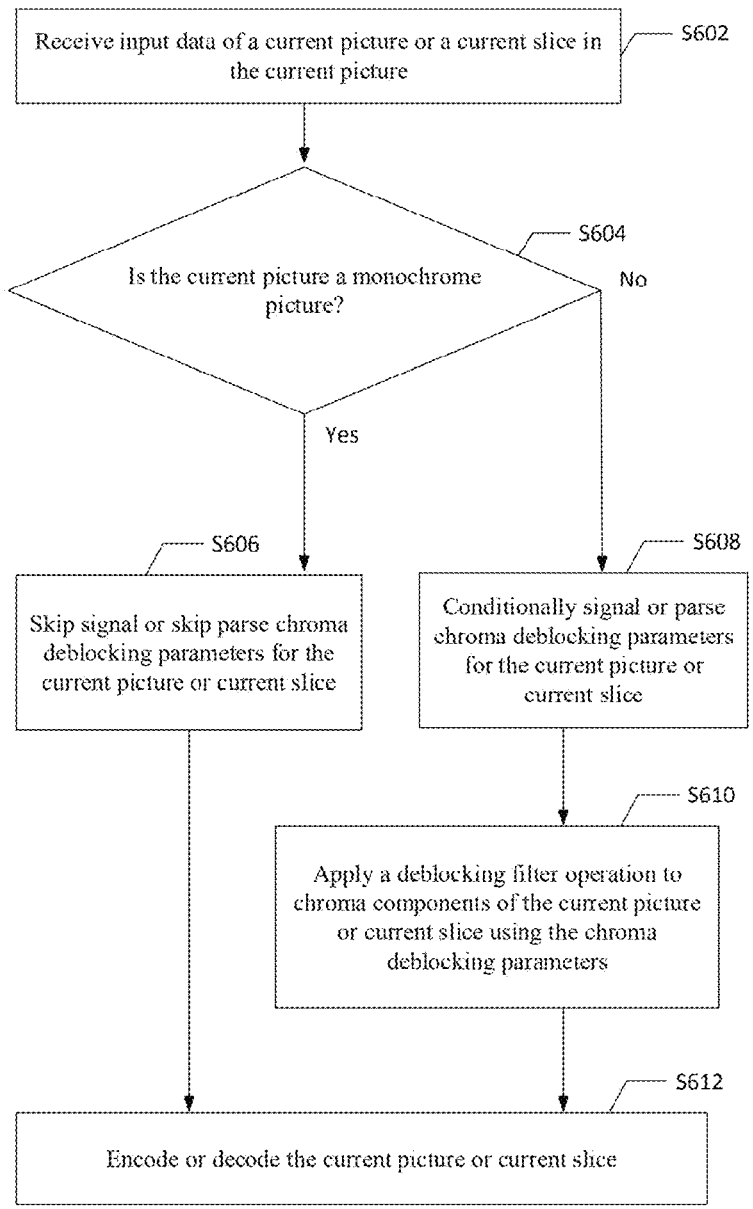
FIG. 6 is a flowchart of processing image or video data by conditionally signaling or parsing chroma deblocking parameters according to an embodiment of the present invention.

Representative Flowchart for Conditionally Signaling Chroma Deblocking Parameters FIG. 6 is a flowchart illustrating an embodiment of an image or video encoding or decoding system processing input data by conditionally signaling or parsing chroma deblocking parameters. The image or video encoding or decoding system receives input data associated with a current picture or input video data associated with a current slice in the current picture in step S602. The image or video encoding or decoding system checks whether the current picture is a monochrome picture in step S604. For example, a PPS level chroma tool offset present flag for the current picture is used to indicate whether the current picture is a monochrome picture. In another example, a SPS syntax element is used to indicate whether the current picture is a monochrome picture. The image or video encoding system is allowed to signal chroma deblocking parameters for the current picture or current slice when the current picture is not a monochrome picture in step S608. For example, the chroma deblocking parameters are signaled in the PPS, PH, or SH. The image or video decoding system conditionally parses chroma deblocking parameters for the current picture or current slice when the current picture is not a monochrome picture in step S608. In cases when the current picture is a monochrome picture, the video encoding or decoding system skips signaling or parsing chroma deblocking parameters for the current picture or current slice in step S606. A deblocking filter operation is applied to chroma components of the current picture or current slice according to the chroma deblocking parameters in step S610 when the current picture is not a monochrome picture. In step S612, the image or video encoding or decoding system encodes or decodes the current picture or current slice.

Figure 7:
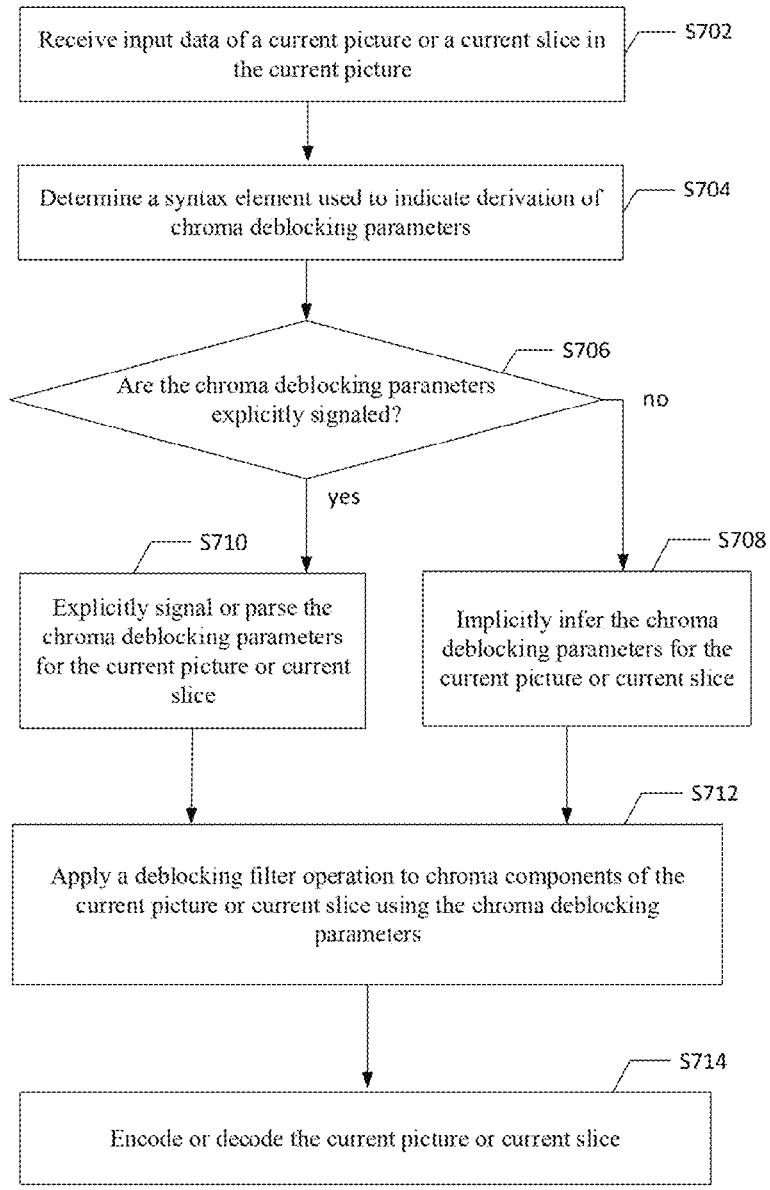
FIG. 7 is a flowchart of processing image or video data by conditionally inferring chroma deblocking parameters according to an embodiment of the present invention.

Representative Flowchart for Conditionally Inferring Chroma Deblocking Parameters FIG. 7 is a flowchart illustrating an embodiment of image or video processing in an image or video encoding or decoding system explicitly signaling or parsing chroma deblocking parameters or implicitly inferring chroma deblocking parameters depending on a value of a syntax element. The image or video encoding or decoding system receives input data of a current picture or a current slice in the current picture in step S702, and determines a syntax element used to indicate derivation of chroma deblocking parameters in step S704. For example, the syntax element is signaled in or parsed from a PPS, PH, or SH associated with the current picture or current slice. In step S706, the image or video encoding or decoding system determines whether the chroma deblocking parameters for the current picture or current slice are explicitly signaled or parsed, or are implicitly inferred according to a value of the syntax element. The chroma deblocking parameters for the current picture or current slice are implicitly inferred in step S708 or explicitly signaled or parsed in step S710 depending on the value of the syntax element. For example, the chroma deblocking parameters may be explicitly signaled in or parsed from a PPS, PH, or SH syntax structure; or the chroma deblocking parameters may be inferred to 0, or inferred from corresponding luma deblocking parameters, or chroma deblocking parameters signaled in another syntax structure. In step S712, a deblocking filter operation is applied to chroma components of the current picture or current slice according to the chroma deblocking parameters. The image or video encoding or decoding system encodes or decodes the current picture or current slice in step S714.

Exemplary Video Encoder and Video Decoder Implementing Present Invention Embodiments of the present invention may be implemented in video encoders and/or video decoders. For example, the disclosed methods may be implemented in an entropy encoding module, an Inter, Intra, or prediction module, a transform module, or a deblocking module of a video encoder, and/or an entropy decoding module, an inverse deblocking module, an inverse transform module, an Inter, Intra, or prediction module of a video decoder. Alternatively, any of the disclosed methods may be implemented as a circuit coupled to the entropy encoding module, the Inter, Intra, or prediction module, the transform module, or the deblocking module of the video encoder and/or the entropy decoding module, the inverse deblocking module, the inverse transform module, the Inter, Intra, or prediction module of the video decoder, so as to provide the information needed by any of the modules. The video encoders have to follow the foregoing syntax design so as to generate a legal bitstream, and the video decoders are able to decode the bitstream correctly only if the parsing process is complied with the foregoing syntax design. When any syntax element is skipped in the bitstream, the video encoders and decoders set the value of the syntax element as an inferred value to guarantee the encoding and decoding results are matched.

Figure 8:
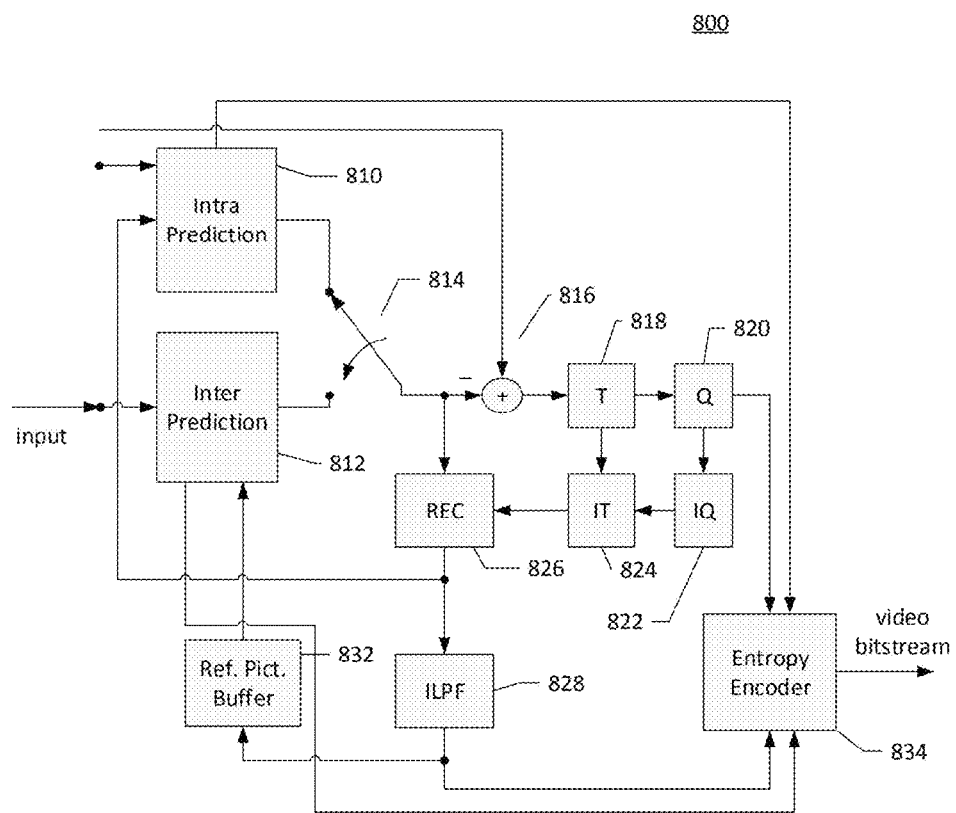
FIG. 8 illustrates an exemplary system block diagram for a video encoding system incorporating the video processing method according to embodiments of the present invention.

FIG. 8 illustrates an exemplary system block diagram for a Video Encoder 800 implementing one or more of the various embodiments of the present invention. An Intra Prediction module 810 provides intra predictors based on reconstructed video data of a current picture. An Inter Prediction module 812 performs Motion Estimation (ME) and Motion Compensation (MC) to provide inter predictors based on referencing video data from other picture or pictures. Either the Intra Prediction module 810 or Inter Prediction module 812 supplies a selected predictor of a current block in the current picture using a switch 814 to an Adder 816 to form residues by subtracting the selected predictor from original video data of the current block. The residues of the current block are further processed by a Transformation module (T) 818 followed by a Quantization module (Q) 820. The transformed and quantized residual signal is then encoded by Entropy Encoder 834 to form a video bitstream. The transformed and quantized residual signal of the current block is processed by an Inverse Quantization module (IQ) 822 and an Inverse Transformation module (IT) 824 to recover the prediction residues. As shown in FIG. 8, the residues are recovered by adding back to the selected predictor at a Reconstruction module (REC) 826 to produce reconstructed video data. The reconstructed video data may be stored in a Reference Picture Buffer (Ref. Pict. Buffer) 832 and used for prediction of other pictures. The reconstructed video data from the REC 826 may be subject to various impairments due to the encoding processing, consequently, at least one In-loop Processing Filter (ILPF) 828 is conditionally applied to the luma and chroma components of the reconstructed video data before storing in the Reference Picture Buffer 832 to further enhance picture quality. A deblocking filter is an example of the ILPF 828. Syntax elements are provided to an Entropy Encoder 834 for incorporation into the video bitstream. In one embodiment of the present invention, chroma deblocking parameters for the current picture or a current slice in the current picture are conditionally signaled in the video bitstream depending on whether the current picture is a monochrome picture. In another embodiment, the chroma deblocking parameters for the current picture or current slice are explicitly signaled or implicitly inferred according to a value of a syntax element signaled in a PPS, PH, or SH.

Figure 9:
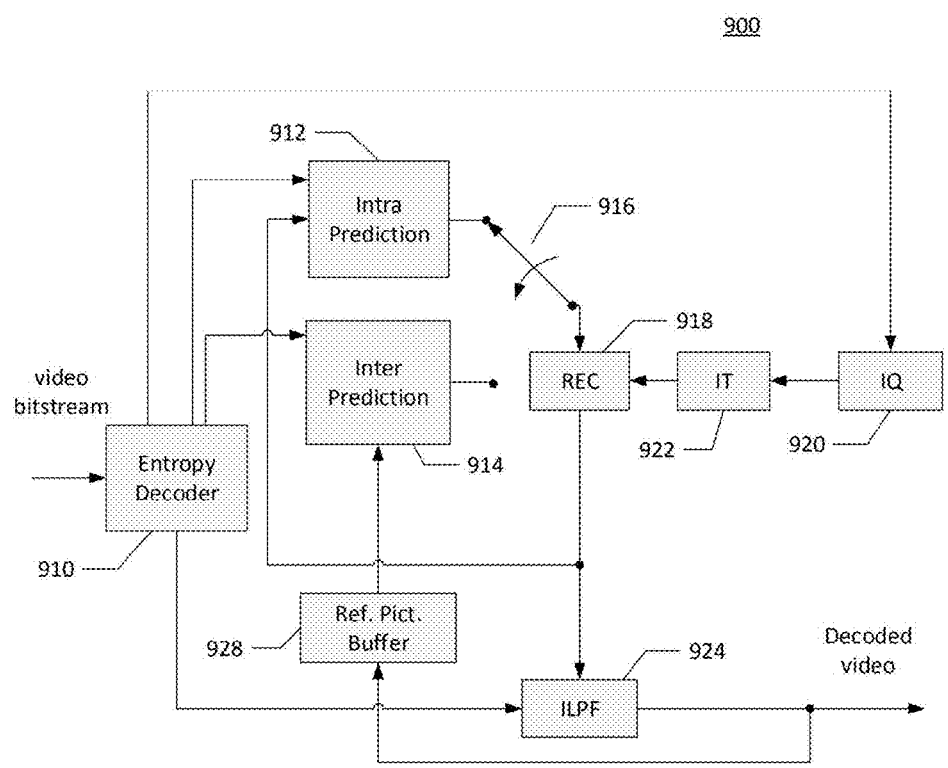
FIG. 9 illustrates an exemplary system block diagram for a video decoding system incorporating the video processing method according to embodiments of the present invention.

A corresponding Video Decoder 900 for the Video Encoder 800 of FIG. 8 is shown in FIG. 9. The video bitstream encoded by a video encoder is the input to the Video Decoder 900 and is decoded by an Entropy Decoder 910 to parse and recover the transformed and quantized residual signal and other system information. The decoding process of the Decoder 900 is similar to the reconstruction loop at the Encoder 800, except the Decoder 900 only requires motion compensation prediction in an Inter Prediction module 914. Each block is decoded by either an Intra Prediction module 912 or Inter Prediction module 914. A Switch 916 selects an intra predictor from the Intra Prediction module 912 or Inter predictor from the Inter Prediction module 914 according to decoded mode information. The transformed and quantized residual signal is recovered by an Inverse Quantization module (IQ) 920 and an Inverse Transformation module (IT) 922. The IQ module 920 is also called a de-quantization module. The recovered residual signal is reconstructed by adding back the predictor in a Reconstruction (REC) module 918 to produce reconstructed video. The reconstructed video is further conditionally processed by at least one In-loop Processing Filter (ILPF) 924 to generate final decoded video. A deblocking filter is one example of the ILPFs 924. In some embodiments of the present invention, chroma deblocking parameters are conditionally parsed for a current picture or current slice depending on whether the current picture is a monochrome picture. In some other embodiments, chroma deblocking parameters for a current picture or a current slice in the current picture are explicitly parsed or implicitly inferred according to a syntax element parsed from a PPS, PH, or SH associated with the current picture or current slice. If the currently decoded picture is a reference picture, the reconstructed video of the currently decoded picture is also stored in a Reference Picture Buffer (Ref. Pict. Buffer) 928 for later pictures in decoding order.

Various components of the Video Encoder 800 and Video Decoder 900 in FIG. 8 and FIG. 9 may be implemented by hardware components, one or more processors configured to execute program instructions stored in a memory, or a combination of hardware and processor. For example, a processor executes program instructions to control determining whether the current picture is a monochrome picture. The processor is equipped with a single or multiple processing cores. In some examples, the processor executes program instructions to perform functions in some components in the Encoder 800 and Decoder 900, and the memory electrically coupled with the processor is used to store the program instructions, information corresponding to the reconstructed images of blocks, and/or intermediate data during the encoding or decoding process. In some examples, the Video Encoder 800 may signal information by including one or more syntax elements in a video bitstream, and the corresponding Video Decoder 900 derives such information by parsing and decoding the one or more syntax elements. The memory in some embodiments includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable mediums listed above. As shown in FIGS. 8 and 9, the Encoder 800 and Decoder 900 may be implemented in the same electronic device, so various functional components of the Encoder 800 and Decoder 900 may be shared or reused if implemented in the same electronic device. For example, one or more of the Reconstruction module 826, Inverse Transformation module 824, Inverse Quantization module 822, In-loop Processing Filter 828, and Reference Picture Buffer 832 in FIG. 8 may also be used to function as the Reconstruction module 918, Inverse Transformation module 922, Inverse Quantization module 920, In-loop Processing Filter 924, and Reference Picture Buffer 928 in FIG. 9, respectively.

Embodiments of the video processing method for more efficient chroma deblocking parameter signaling may be implemented in a circuit integrated into a video compression chip or program code integrated into video compression software to perform the processing described above. For examples, conditionally signaling or parsing chroma deblocking parameters may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. An image or video processing method in an image or video coding system, comprising:
   receiving input data associated with a current picture or receiving input data associated with a current slice in the current picture;
   determining that the current picture is not a monochrome picture;
   determining a syntax element used to indicate derivation of chrominance (chroma) deblocking parameters for the current picture or current slice;
   implicitly inferring the chroma deblocking parameters for the current picture or current slice from luma deblocking parameters according to a value of the syntax element;
   applying a deblocking filter operation to chroma components of the current picture or the current slice according to the chroma deblocking parameters, the applying based on signaling or parsing the chroma deblocking parameters for the current picture or the current slice and further based on the determining that the current picture is not a monochrome picture; and
   encoding or decoding the current picture or the current slice of the current picture.

2. The method of claim 1, wherein the chroma deblocking parameters comprise deblocking offsets beta and tC for the chroma components.

3. The method of claim 1, wherein the chroma deblocking parameters are allowed to be signaled in a Picture Header (PH) associated with the current picture when a syntax element ChromaArrayType is not equal to 0.

4. The method of claim 1, wherein the chroma deblocking parameters are allowed to be signaled in a Slice Header (SH) associated with the current slice when a syntax element ChromaArrayType is not equal to 0.

5. An apparatus of image or video processing for an image or video encoding or decoding system, the apparatus comprising one or more electronic circuits configured for:
   receiving input data associated with a current picture or receiving input data associated with a current slice in the current picture;
   determining that the current picture is not a monochrome picture;
   determining a syntax element used to indicate derivation of chrominance (chroma) deblocking parameters for the current picture or current slice;
   implicitly inferring the chroma deblocking parameters for the current picture or current slice from luma deblocking parameters according to a value of the syntax element;
   applying a deblocking filter operation to chroma components of the current picture or the current slice according to the chroma deblocking parameters, the applying based on signaling or parsing the chroma deblocking parameters for the current picture or the current slice and further based on the determining that the current picture is not a monochrome picture; and
   encoding or decoding the current picture or the current slice of the current picture.

* * * * *